(12) United States Patent
Luckay et al.

(10) Patent No.: US 11,887,205 B2
(45) Date of Patent: Jan. 30, 2024

(54) BEACON ENABLED DISTRIBUTION ITEMS

(71) Applicant: United States Postal Service, Washington, DC (US)

(72) Inventors: Ryan M. Luckay, Washington, DC (US); Robert E. Dixon, Jr., Washington, DC (US); James E. Lee, Sr., Washington, DC (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 18/055,354

(22) Filed: Nov. 14, 2022

(65) Prior Publication Data

US 2023/0073841 A1 Mar. 9, 2023

Related U.S. Application Data

(60) Continuation of application No. 16/582,215, filed on Sep. 25, 2019, now Pat. No. 11,501,400, which is a (Continued)

(51) Int. Cl.
*G06Q 50/28* (2012.01)
*H04W 12/47* (2021.01)
(Continued)

(52) U.S. Cl.
CPC ......... *G06Q 50/28* (2013.01); *G06K 7/10108* (2013.01); *G06K 19/025* (2013.01); (Continued)

(58) Field of Classification Search
CPC .. G08B 21/0275; G08B 3/1016; G06Q 20/28; G06Q 50/28; G06Q 10/08; G06Q 50/01; G06Q 20/3224; G06Q 20/3263; G06Q 20/3278; G06Q 20/40155; Y02P 90/02; G05B 19/4183; H04W 12/47; H04W 12/06; H04W 4/021; H04W 4/029; H04W 4/33; H04W 4/35; H04W 24/04; H04W 64/00; H04W 64/006; H04W 24/08; H04W 4/80; H04W 52/0229; H04W 52/0245; H04W 64/003; H04W 76/10; G06K 19/07758; G06K 7/10099; G06K 7/10475; G06K 19/025; G06K 7/10108; H04B 1/3816; H04B 1/3883; H04B 1/3888; H04B 17/27; H04B 17/318; H04B 5/00; H04B 5/0056; H04B 5/0062; G01S 1/08; G01S 11/06; G01S 13/06; G01S 13/75; G01S 13/878; G01S 19/13; G01S 5/14; G01S 7/003;
(Continued)

(56) References Cited

U.S. PATENT DOCUMENTS 8,723,648 B2 * 5/2014 Attew .................. G01S 5/14
340/10.1
10,235,857 B2 3/2019 Jones
(Continued)

*Primary Examiner* — Dionne Pendleton
(74) *Attorney, Agent, or Firm* — Knobbe Martens Olson & Bear LLP

(57) ABSTRACT

Systems and methods of tracking distribution items using hardware components on or in the distribution items. Shippers and recipients of distribution items can track or locate a distribution item, especially a high value item, if the distribution item is lost, misrouted, or delayed.

20 Claims, 9 Drawing Sheets

Related U.S. Application Data division of application No. 15/862,003, filed on Jan. 4, 2018, now Pat. No. 10,650,479.

(60) Provisional application No. 62/505,299, filed on May 12, 2017, provisional application No. 62/442,345, filed on Jan. 4, 2017.

(51) Int. Cl.

| | | |
|---|---|---|
| *G08B 3/10* | (2006.01) | |
| *G06K 19/077* | (2006.01) | |
| *G06K 7/10* | (2006.01) | |
| *H04W 24/04* | (2009.01) | |
| *G08B 21/02* | (2006.01) | |
| *G06K 19/02* | (2006.01) | |
| *G06Q 20/28* | (2012.01) | |

(52) U.S. Cl.
CPC ....... *G06K 19/07758* (2013.01); *G06Q 20/28* (2013.01); *G08B 3/1016* (2013.01); *G08B 21/0275* (2013.01); *H04W 12/47* (2021.01); *H04W 24/04* (2013.01)

(58) Field of Classification Search
CPC .......... G01S 1/68; G06F 3/017; G06F 3/0346; G06F 3/14; H04L 67/141; H04L 67/52; Y02D 30/70
See application file for complete search history.

(56) References Cited

U.S. PATENT DOCUMENTS

| | | |
|---|---|---|
| 10,699,152 B1 | 6/2020 | Adam et al. |
| 10,783,484 B1 * | 9/2020 | Mishra ............... G06Q 30/0635 |
| 2006/0229895 A1 | 10/2006 | Kodger, Jr. |
| 2007/0008129 A1 | 1/2007 | Soliman |
| 2007/0188341 A1 | 8/2007 | Seifert |
| 2008/0030359 A1 | 2/2008 | Smith et al. |
| 2008/0143482 A1 * | 6/2008 | Shoarinejad .......... H04W 64/00 340/8.1 |
| 2008/0296373 A1 | 12/2008 | Zmood et al. |
| 2009/0109049 A1 | 4/2009 | Frederick et al. |
| 2010/0225447 A1 | 9/2010 | Adra |
| 2012/0001765 A1 | 1/2012 | Boccola |
| 2014/0282257 A1 | 9/2014 | Nixon et al. |
| 2015/0298813 A1 | 10/2015 | Cavan et al. |
| 2015/0369618 A1 | 12/2015 | Barnard et al. |
| 2016/0078264 A1 | 3/2016 | Armstrong et al. |
| 2016/0152350 A1 | 6/2016 | Puentes et al. |
| 2016/0195602 A1 | 7/2016 | Meadow |
| 2016/0371516 A1 | 12/2016 | Debates et al. |
| 2017/0018042 A1 | 1/2017 | Pudipeddi et al. |
| 2017/0053143 A1 | 2/2017 | Cristache |
| 2017/0067983 A1 | 3/2017 | Teicher |
| 2017/0359412 A1 | 12/2017 | Haebler et al. |
| 2017/0371322 A1 | 12/2017 | Lake et al. |
| 2018/0077535 A1 * | 3/2018 | Todeschini .......... H04W 40/244 |
| 2018/0169858 A1 | 6/2018 | Jain et al. |
| 2018/0240067 A1 | 8/2018 | Oz et al. |
| 2019/0012705 A1 | 1/2019 | Todeschini et al. |
| 2019/0034851 A1 | 1/2019 | Swieter et al. |
| 2019/0097668 A1 * | 3/2019 | Nicolaidis ............. H04W 4/029 |
| 2019/0362304 A1 | 11/2019 | Vivas Suarez et al. |
| 2019/0373431 A1 * | 12/2019 | Gabriele .......... G06Q 20/40155 |
| 2020/0017313 A1 | 1/2020 | Mori |
| 2020/0074402 A1 | 3/2020 | Adato et al. |
| 2020/0096599 A1 | 3/2020 | Hewett et al. |
| 2020/0125813 A1 | 4/2020 | Flores et al. |
| 2020/0293851 A1 | 9/2020 | Bakke |

* cited by examiner

BEACON ENABLED DISTRIBUTION ITEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 16/582,215, filed Sep. 25, 2019, which claims priority to U.S. application Ser. No. 15/862,003, filed Jan. 4, 2018, which claims priority to U.S. Application Nos. 62/442,345 filed Jan. 4, 2017 and 62/505,299 filed May 12, 2017, the entire contents both of which are hereby incorporated by reference.

BACKGROUND

The present disclosure relates to items having hardware thereon capable of being tracked and to systems for tracking these packages. Shippers and recipients of distribution items may want to be able to track or locate a distribution item, especially a high value item. It is also desirable to be able to find or locate a particular item from a plurality of items, for example, if the distribution item is lost, misrouted, or delayed.

BRIEF SUMMARY

In one aspect described herein, a distribution item comprises an outer package; a power supply attached to the outer package; and a beacon attached to the outer package and in electrical communication with the power supply, wherein the beacon is configured to emit a unique signal recognizable by an interrogation device.

In some embodiments the power supply and beacon are attached via one or more leads.

In some embodiments the outer package comprises a pull tab connected to the one or more leads.

In some embodiments the pull tab adheres to at least one of the one or more leads, and when the pull tab is pulled, a portion of the at least one of the one or more leads is removed with the pull tab.

In some embodiments the unique signal uniquely identifies the distribution item.

In some embodiments, the beacon comprises an antenna and the unique signal is a radio frequency signal.

In some embodiments the beacon comprises an audible annunciator, and wherein the audible annunciator is configured to emit an audible signal in response to an interrogation signal.

In some embodiments, the beacon comprises a mechanical vibration component configured to vibrate in response to an interrogation signal.

In some embodiments the power supply and beacon are contained within a label that is adhered to the outer package.

In some embodiments the power supply and the beacon are embedded within a portion of the outer package.

In some embodiments the beacon comprises a pressure sensitive layer configured to activate the beacon upon application of pressure to the beacon.

In another aspect described herein, a method of locating a distribution item comprises receiving a request in a user interface to locate an item, the item having a beacon thereon; communicating the request to a central server; activating a plurality of sensors in a distribution facility; receiving a signal from the beacon on the item in at least one of the plurality of sensors in the distribution facility; and determining the location of the item within the distribution facility based on the received signal from the beacon on the item.

In some embodiments, the method further comprises sending, via the plurality of sensors, an interrogation signal recognizable by the beacon.

In some embodiments, the interrogation signal is configured to cause the beacon to emit a signal.

In some embodiments the beacon emits a radio frequency signal in response to the interrogation signal.

In some embodiments the beacon emits an audible signal in response to the interrogation signal.

In some embodiments, the method further comprises determining a unique identifier for the beacon based on the request to locate the item.

In some embodiments, the method further comprises causing the beacon to emit a signal recognizable to a portable computing device in communication with the central server and providing a visual indication of the location of the of the item within the distribution facility.

In some embodiments, the method further comprises providing, via the user interface, location information.

In another aspect described herein, a system for locating an item comprises means for receiving a request to locate an item, the item having a beacon thereon; means for communicating the request to a central server; means for activating a plurality of sensors in a distribution facility; means for receiving a signal from the beacon on the item in the distribution facility; and means for determining the location of the item within the distribution facility based on the received signal from the beacon on the item.

DETAILED DESCRIPTION

Figure 1:
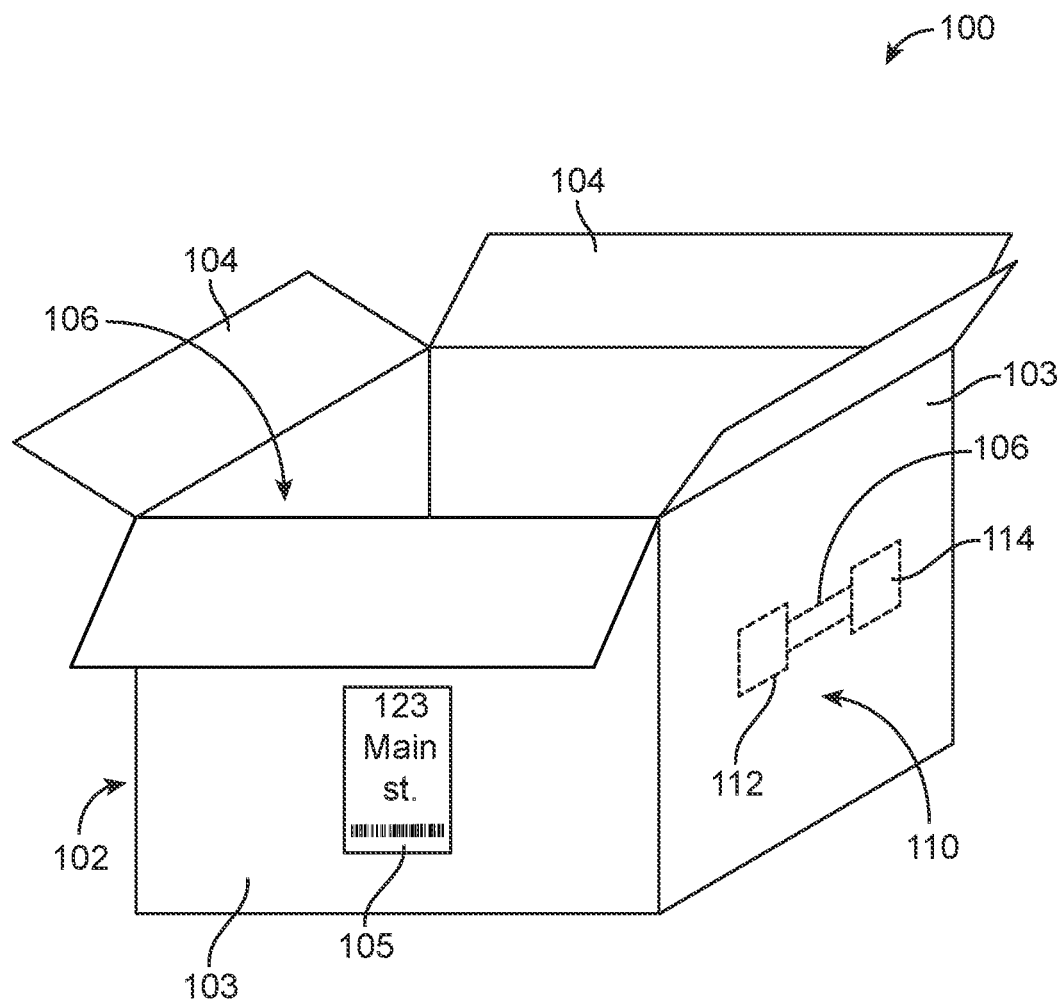
FIG. 1 is a perspective view of an embodiment of an distribution item.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for providing location, tracking, and other services using a hardware beacon attached or embedded in a distribution item. The beacon can be used to identify, locate, and track the item having the beacon. For example, a distribution network processes many items a day. Some items are valuable in terms of sentimental value, monetary value, or other valued item, tracking of such items is desired to ensure the item arrives at the intended destination. Such items may become lost, misrouted, or delayed. In such a circumstance, a distribution network can locate a particular item using a unique identifier contained in circuitry or hardware on the item, on the packaging of the item, or embedded in the item or the packaging. The circuitry or hardware can be a beacon for locating and tracking the item.

As used herein, the term beacon can signify an electronic device which can encode a unique identifier which can be read and identified by a computing device. For example, a beacon can be a radio frequency tag, either passive or active, a Bluetooth-type device, near field communication (NFC) device, or other similar device.

As used herein, the term item or distribution item may refer to discrete articles in the distribution network, such as mailpieces, letters, flats, magazines, periodicals, packages, parcels, pallets, bags, cases, trunks, suitcases, and the like. The term item can also refer to trays, containers, conveyances, crates, boxes, bags, and the like. As used herein, the term carrier may refer to an individual assigned to a route who delivers the items to each destination. The term may also refer to other delivery resources, such as trucks, trains, planes, and other components of the distribution network. The present disclosure also relates to systems and methods to identify, locate, and track distribution items. As used herein, the term module may refer to a specific purpose computer, including a dedicated memory and specific programming, a hardware embodied processor, or a specifically programmed or designed application. An exemplary distribution network may be the United States Postal Service. With the large number of items, tracking a single item or finding a particular item can be challenging. Although the United States Postal Service is discussed herein as an exemplary distribution network, it will be understood that this disclosure is not limited thereto.

A distribution network may comprise multiple levels. For example, a distribution network may comprise regional distribution facilities, hubs, and unit delivery facilities, or any other desired level. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP code. The unit delivery facility receives items from local senders, and from hub level facilities or regional distribution facilities. The unit delivery facility also sorts and stages the items intended for delivery to destinations within the unit delivery facility's coverage area. Each of the levels in the distribution network may act as an intake facility where items are inducted into the delivery stream.

As an item is processed in a distribution network, if the item is separated from the processing equipment, for example, falls of a conveyor belt, is misplaced by a carrier, etc., the item may not be noticed or seen for an extended period of time due to the large number of items processed in a facility. This can lead to loss of the item, delay in delivery, damage to the item, and the like. To avoid or mitigate the consequences of losing an item or delaying delivery, a customer may wish to use a container or package which allows unique and individual tracking of an item. Where a high value item is to be shipped, such as human remains, jewelry, irreplaceable items, heirlooms, and the like, a beacon, such as an RF or Bluetooth beacon can be embedded in packaging or an item, or be affixed to a surface of packaging or the item. Although high value items are described above, the beacon enabled box described herein can be used for sending any desired item, and can give a sender peace of mind and a high degree of confidence that the item will be successfully and timely delivered. A customer can purchase a beacon or packaging with a beacon-enabled box, which has a beacon device thereon or embedded therein for use with the distribution network. The customer can place the article in the beacon-enabled box. The beacon can store and/or be associated a unique identifier which can be associated with the article, the shipper, and the recipient. The customer seals the beacon-enabled box, which activates the beacon. When the beacon-enabled box enters the mail stream (in the case of the United States Postal Service (USPS)), the beacon can be activated and can send a signal via an RF signal, Bluetooth protocol, and the like.

If the item is not delivered, or is delayed, a customer can provide the beacon number to the distribution network, such as by checking status in a mobile application, inputting a unique identifier in a tracking system, by calling the distribution network, or otherwise requesting item status. The distribution facility, vehicle, carrier, processing equipment, etc., where the beacon-enabled box was last scanned can be searched using a system or network of beacon detectors to identify the precise location of the beacon-enabled box. This can assure that the item to be delivered is not lost.

When the beacon-enabled box arrives, the recipient can open the box, thereby deactivating the beacon to prevent further tracking of the beacon.

FIG. 1 depicts a perspective view of an embodiment of an item 100 for distribution within a distribution network. The item 100 comprises a package 102, and a beacon 110. The terms item 100 and package 102 may be used interchangeably throughout this description.

The package 102 depicted is generally box-shaped, and can be similar to standard cardboard box. The package 102 is exemplary only, and a person of skill in the art would understand that the principles described here can be implemented with a variety of packaging devices or methods.

The package 102 comprises a plurality of sides 103, a plurality of closure flaps 104 (shown in an open position), and an internal volume 106 which is bounded by the plurality of sides 103 and the plurality of closure flaps 104, when the closure flaps 104 are closed (not shown).

The package 102 is configured to receive an article to be shipped or distributed. In some embodiments, the article to be shipped or distributed is a high value item and so tracking is desired. In some embodiments, the tracking can be the ability to locate the item 100 if it becomes lost or misrouted. A label 105 can be applied to the package 102 to identify the source, intended recipient, postage payments, service class, to provide a tracking number, a unique identifier, and the like.

The beacon 110 is disposed on the package 102, and can be disposed on one of the sides 103 or on one of the closure flaps 104. As shown, the beacon 110 is disposed on one of the sides 103. The beacon 110 is attached to an external surface of side 103. In some embodiments, the beacon 110 can be embedded within the structural material of the side 103, for example, embedded within the cardboard structure of the side 103. In some embodiments, the beacon 110 can be affixed to an outer or inner surface of the side 103, and it can be covered by a covering (not shown) or a coating. In order to operate, the beacon 110 need not be physically visible. In some embodiments, the beacon 110 can be placed directly on the article being shipped, in case the article is removed from the package 102, the package 102 is damaged, or the article falls out of the package 102.

The beacon 110 comprises a power source 112, a sensor 114, and one or more electrical leads 116. The power source 112 and the sensor 114 are shown in dashed lines, which indicate that the power source 112 and the sensor 114 may be embedded in the material of the package 102 or may be adhered to an internal or external surface of one of the sides 103 of the package 102. The power source 112 provides electrical energy to the sensor 114 via the one or more electrical leads 116. The power source 112 can be a chemical cell battery, such as a lithium ion, nickel cadmium, and the like, and can have a variety of form factors. The power source 112 has the capacity to power the sensor 114 for a predetermined amount of time, for example, for 30 days after activation, which will be discussed in greater detail below. In some embodiments, the power source 112 is sized and configured to power the sensor 114 for 2 days, 5 days, 7 days, 10 days, 20 days, 45 days, 6 months, or more, or for any other time, as desired. The power source 112 will likely not be recharged, so it should have sufficient capacity to power the sensor 114 for enough time for the package 102 to be obtained by a customer and used to ship an item without the power source 112 failing.

The sensor 114 can be a Bluetooth enabled chip, and RF antenna, an integrated circuit with broadcasting and receiving capability, a paper-thin circuit, such as a circuit printed onto a surface, a hybrid RFID chip, and the like. The sensor 114 can be connected to a visual indicator (not shown), such as an LED, to an audible indicator (not shown) such as a speaker or sound emitting device, and to a vibration element (not shown), which can cause the beacon 110 to vibrate when it is identified, as will be described elsewhere herein. The sensor 114 has a memory which can store a unique identifier. The unique identifier, or an identifier corresponding to the unique identifier can be printed and be visible or readable on the label 105. In some embodiments, the label 105 includes a number, such as a serial number, that can be associated with the unique identifier stored in the sensor 114 in a central computing system, to facilitate tracking of the item 100. The sensor 114 further comprises an antenna or other transmitting and receiving capabilities (not shown) to allow the sensor to receive an interrogations signal, read the signal, and respond if the interrogation signal corresponds to, or is associated with the unique identifier. The sensor 114 is adapted to transmit a signal on the electromagnetic spectrum, for example, radio frequency. The sensor 114 can transmit a signal with the unique identifier so as to be identified by a reader or some other device. The sensor 114 can pair, via a Bluetooth connection, or can simply transmit a signal, such as an RF signal. The sensor 114 can also actively listen for an interrogation signal, and can provide a response thereto, as will be described elsewhere herein. In some embodiments, the sensor 114 broadcasts continually, intermittently, or periodically. In some embodiments, the sensor 114 emits a signal only in response to an interrogation signal.

In some embodiments, the beacon 110 can include a GPS receiver or position locator that can be used to identify the location of the item 100 using a GPS system.

In some embodiments, the sensor 114 can store and broadcast additional information, such as an identifier of service type (e.g., first class mail, high-value item, and the like), an identifier of the article within the package 102 (e.g., cremated ashes, high dollar item), the destination or recipient, and/or the sender. This information can be programmed into the sensor 114 and can be stored within the sensor 114. The sensor 114 can be thin and flexible, and easy to incorporate into packaging material, such as corrugated paper, cardboard, and the like. In some embodiments, the sensor 114 can include a thin, flexible antenna formed by applying or printing layers of conductive material in liquid form on top of each other in a spiral to generate an antenna which is connected to the sensor 114.

Figure 2A:
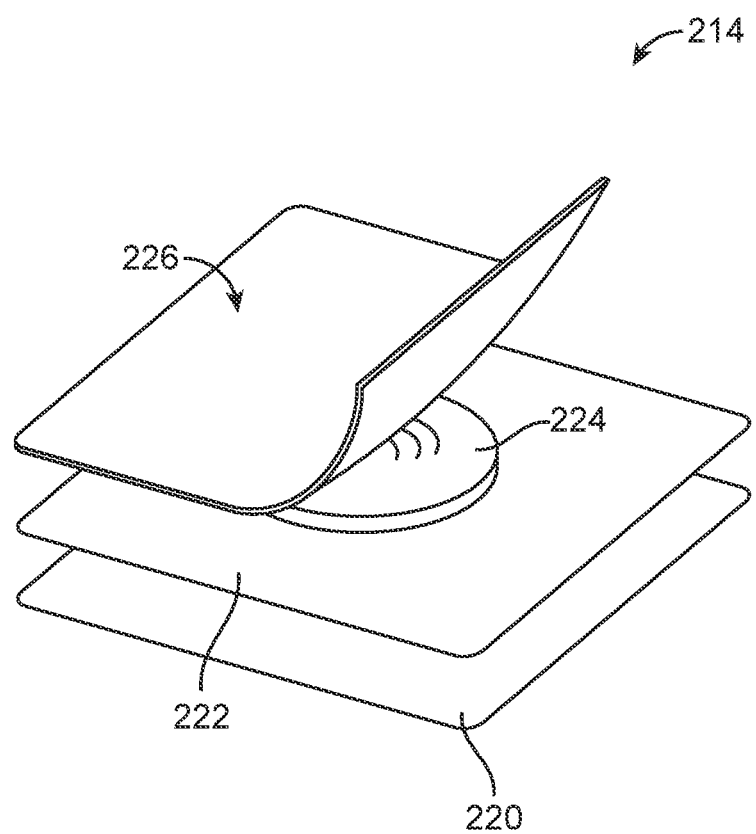
FIG. 2A is an exploded perspective view of an embodiment of a beacon sensor.

FIG. 2A is an exploded perspective view of an embodiment of a sensor having a Bluetooth-type capability. A sensor 214 comprises a pressure sensitive layer 220, a pattern adhesive coating 222, a microchip 224, and a conforming layer 226. The pressure sensitive layer 220 can comprise an adhesive and a pressure sensor. The pressure sensor can be in electrical connection with the microchip 224 to send a signal to the microchip 224 when the pressure sensor is activated. The adhesive can be coated by a protecting layer (not shown) which is peeled off before the sensor 114 is applied to the package 102. The pressure sensitive layer 220 can be used to activate the sensor 214. For example, when a user purchases a beacon 110 or a sensor 114 (which may be connected to a power source as described with regard to FIG. 1), a user can peel the protecting layer off the pressure sensitive layer to expose the pressure sensitive layer 220 and the adhesive. The user can then attach the sensor 214 to the package 102 by pressing the sensor 214 onto the package 102. The pressure from pressing the sensor 214 onto the package 102 to adhere the sensor 214 thereto activates the pressure sensor, which sends a signal to the microchip 224, which can activate or turn on the sensor 214.

The pattern adhesive coating 222 connects the pressure sensitive layer 220 to the microchip 220, protects the microchip 224, and can have a pattern formed therein. The pattern can act as an antenna for receiving and/or broadcasting signals from the microchip 224. The microchip 224 can be a Bluetooth receiver/transmitter having a storage, a microprocessor, and circuitry. The microchip 224 can be in electrical connection with the pattern formed in the pattern adhesive layer 222 for sending and receiving signals. In some embodiments, the antenna is part of the microchip 224. The microchip 224 is in electrical connection with a power supply, such as power source 112, for powering the microchip 224.

The conforming layer 226 can be a high density foam. The conforming layer adheres to the microchip 224 and the pattern adhesive layer 222 to seal and protect the microchip 224 from environmental factors, humidity, impact, damage, and the like.

Figure 2B:
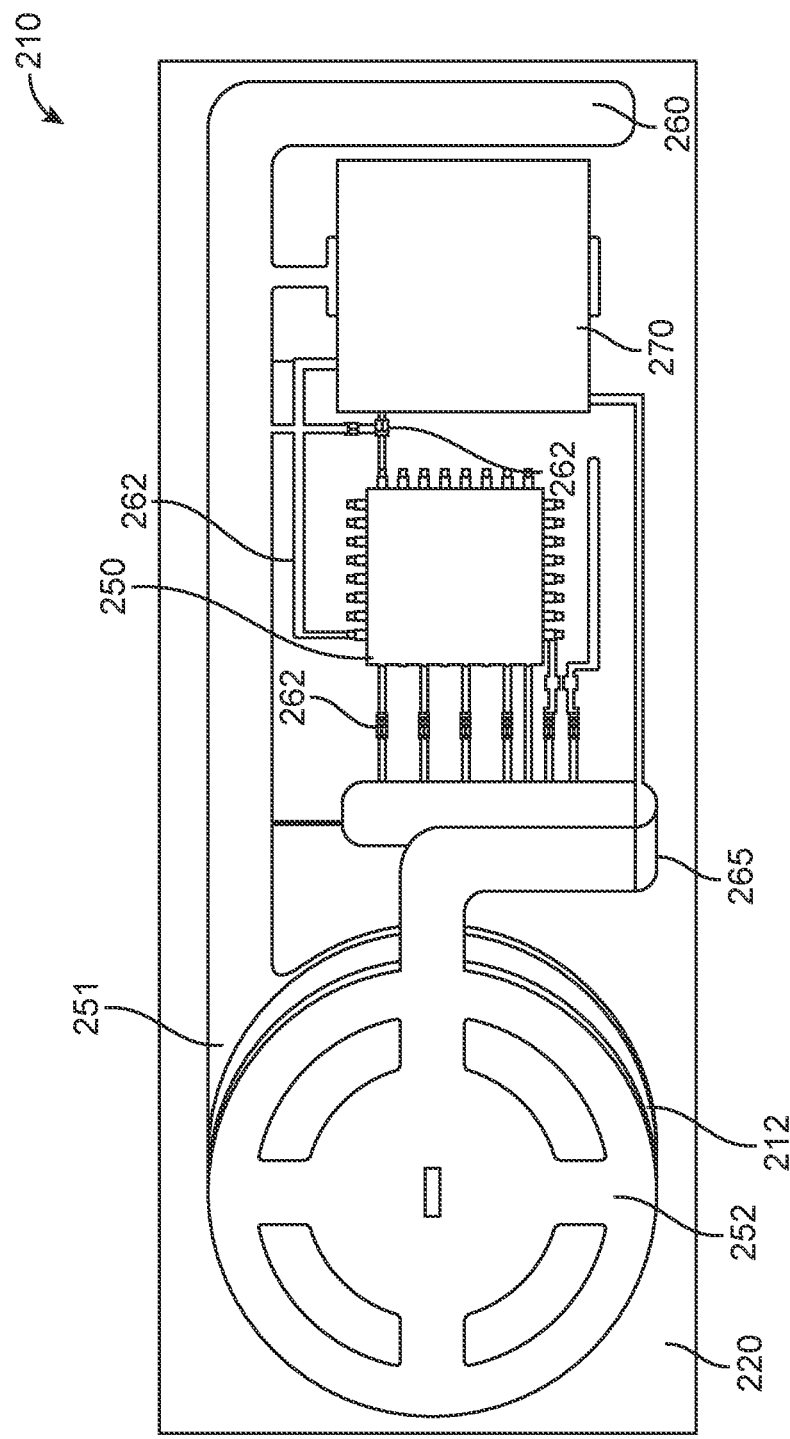
FIG. 2B is a top view of an embodiment of a beacon sensor.

FIG. 2B is an embodiment of a beacon sensor having Bluetooth® capabilities. The beacon 210 comprises a battery 212, a Bluetooth® chip 250, an antenna 260, and an annunciator 270.

The battery 212 can be similar to power sources described elsewhere herein. In some embodiments, the battery 212 can be a coin cell or button cell-type battery. The battery 212 is connected to the rest of the sensor 212 via a first contact 251 and a second contact 252.

The chip 250 is a Bluetooth® enabled microchip similar to those described elsewhere herein. The chip 250 can have an on-board memory to store information that can be programmed into the chip, and that can be changed, modified, supplemented, or removed using with the appropriate hardware and communication protocols. The chip 250 controls the operation of the beacon 210.

The chip 250 is in communication with the antenna 260 and the annunciator 270. The antenna 260 can be a metal or metallic lead. In some embodiments, the antenna 260 can be printed using a conductive ink, or produced through other methods. The production of the beacon 210 will be described in greater detail below.

The annunciator 270 can be an audible, optical, or electromechanical signal. For example, the annunciator 270 can comprise an audible transmitter which can emit an audible signal. In some embodiments, the annunciator 270 can provide an optical signal, such as a visual indicator, a light, such as an LED, etc. In some embodiments, the annunciator 270 can provide an electromechanical signal, such as a vibration.

The beacon 210 further comprises a conductive pattern 262 which electrically connects the components of the beacon 210 to each other. For example, the conductive pattern 262 connects the chip 250 to the first and second contacts 251, 252, to the antenna 260, and to the annunciator 270.

To produce a beacon 210, the conductive pattern 262 can be printed onto a substrate 220. The substrate can be a clear or opaque backing, and can comprise an adhesive. The conductive pattern 262 can be printed on the substrate 220 using a conductive ink in a predetermined pattern. The antenna 260 can be printed using conductive ink, or can be laid down as a metallic or foil trace. After the conductive pattern 262 and the metallic traces have been applied to the substrate, the chip 260 and the annunciator 270 can be positioned onto the substrate at precise locations within the conductive pattern 262 to make all the necessary electrical connections.

In some embodiments, the second contact 252 is applied to the substrate 220 in the same plane as the first contact 251, the conductive pattern 262 and the antenna 260. The second contact 252 can then be folded through a flexible fold point 265. The radius of the fold point 265, or the distance between the first contact 251 and the second contact 252 after folding can correspond to the thickness of the battery 212.

Production of the beacon 210 can be a continuous manufacturing process where a thin filament is coated with several conductive inks in order to create a customizable flexible circuit board, and then the components, such as the battery 212, the chip 250, and the annunciator 270, are applied to the flexible circuit board. The production and assembly process proceeds without the fabrication machines being stopped. As the production of one beacon 210 is complete, the filament is severed at allocated locations to create separate beacons 210.

The beacon 210 operates in a manner similar to the sensors described elsewhere herein. In some embodiments, the beacon 210 can include additional functionality or sensors (not shown) which are positioned on the substrate 220 and are electrically connected to the chip 250 and the battery 212. For example, the beacon 210 may include a temperature sensor, a humidity sensor, an elevation sensor, a force or impact sensor, or any other desired sensor. The temperature sensor can be disposed within the item, such as on the internal surface of a box or container so the temperature sensor can detect the temperature of the internal environment of a box or container. In some embodiments, the temperature sensor or other sensor can be configured to communicate the temperature, humidity, impact force, or other parameters together with the identifier or other information by broadcast via the antenna 260 in the Bluetooth or other wireless signal. The temperature of the inside of the box, for example, can be sent to a control hub (as will be described elsewhere herein), and can be used to determine whether the weather or environment surrounding the item 100 will have adverse effects on the contents of the item.

Figure 2C:
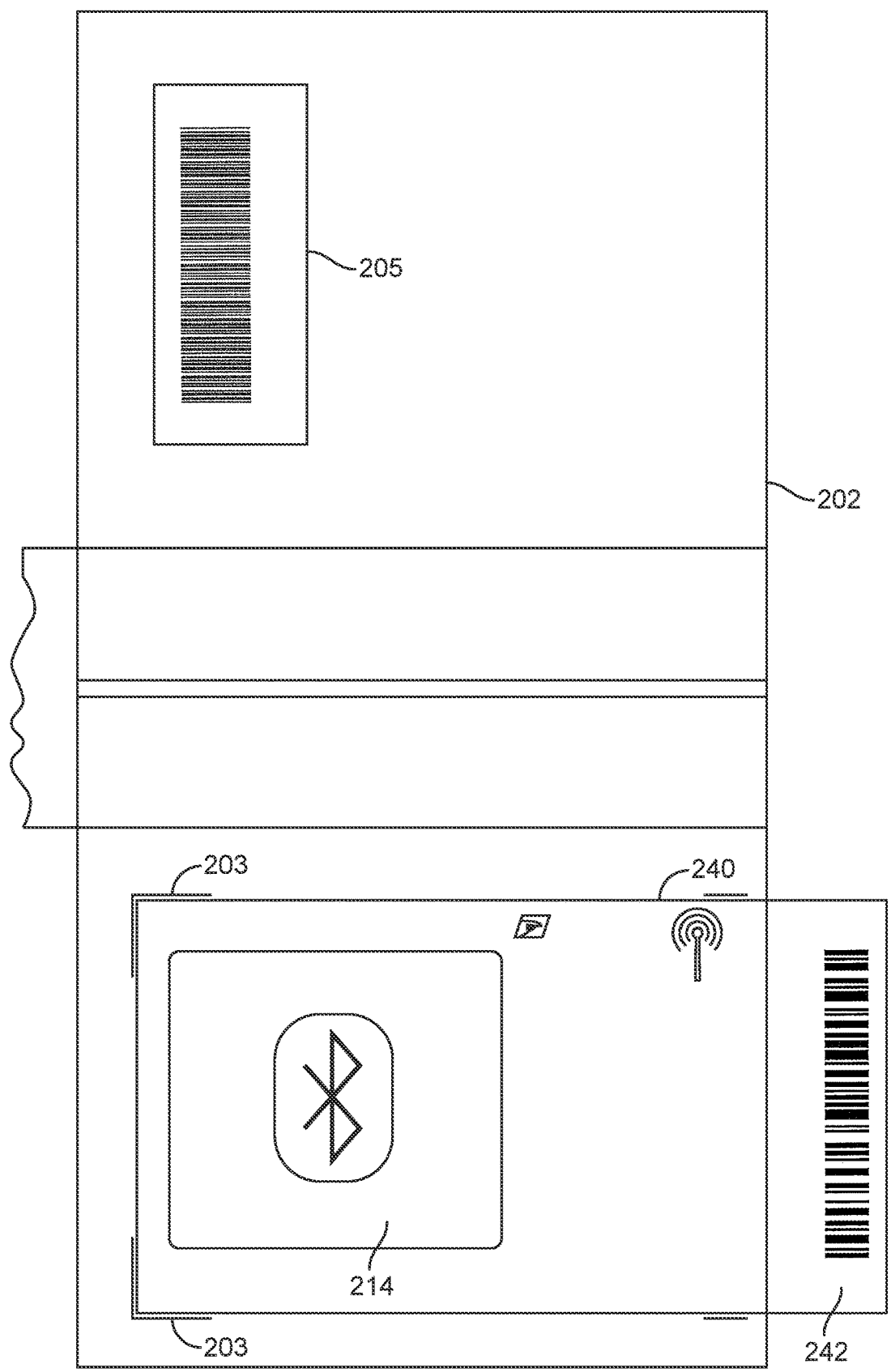
FIG. 2C is an embodiment of a sensor label, having a sensor therein, for use on a package.

FIG. 2C is an embodiment of a sensor label, having a sensor 214 therein, for use on a portion of a package 202. A sensor label 240 has the sensor 214 therein, as described elsewhere herein. In some embodiments, the sensor label 240 includes both the sensor 214 and a power source. The sensor label 240 comprises a code section 242, which is removable or foldable along a score line.

The sensor label 240 is configured to be applied to the package 202. In some embodiments, the package 202 is specially configured to receive the sensor label 240, having a designated portion of the package 202 to which the sensor label 240 is to be affixed. This area can be marked on the package 202 by indicator lines 203. An article to be shipped is placed within the package 202, the sensor label 240 is applied to the package 202, and the package 202 is sealed.

The sensor 214 can be activated by the pressure sensitive switch described above. A user can then scan a computer readable code, such as a barcode from the code section 242 of the sensor label 240. The computer readable code can encode a serial number unique to the sensor 214, and which is stored in the sensor 214. The user scans the computer readable code, or otherwise inputs the code into a computing device, such as via an application running on smartphone, to register the serial number, or unique identifier with the distribution network, or to activate a tracking service for the sensor label 240. In some embodiments, the user can pair a computing device with the sensor label 240 using a Bluetooth or other similar protocol, which, once paired, can transmit to the distribution network, via the smart device, the unique identifier or serial number of the sensor 214 to the distribution network. This process will be described in greater detail below.

The user can also associate the code for the sensor 214 with a label 205 on the package 202. The user can input a unique identifier for the sensor 214, and input a number or code from the label 205, and form an association, or cause an association to be formed in the systems of the distribution network. In this way, the sensor 214 and/or the label 205 can be used to provide location, scan information, and processing status of the package 202.

Figure 3:
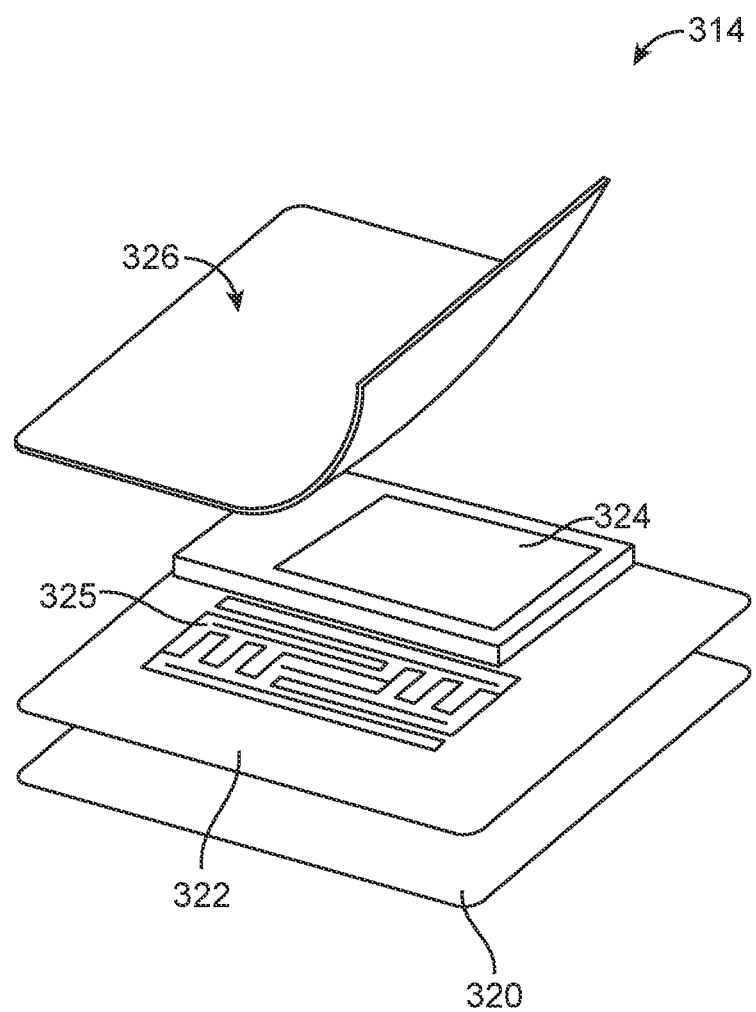
FIG. 3 is an exploded perspective view of an embodiment of a beacon sensor.

FIG. 3 is an exploded perspective view of an embodiment of a sensor having an RFID hybrid capability. A sensor 314 comprises a pressure sensitive layer 320, a pattern adhesive layer 322, an active RFID chip 324, a passive RFID inlay 325, and a conforming layer 326. The pressure sensitive layer 320 and the pattern adhesive layer 322 can be similar to those described elsewhere herein. The pattern adhesive layer 322 may not have a pattern antenna therein where the passive RFID inlay 325 is used.

The active RFID chip 324 can be an active RFID circuit capable of storing an identifier or other information and receiving and broadcasting a signal according to the stored identifier as described elsewhere herein. The active RFID chip 324 is connected to a power supply, similar to power source 112 to power the active RFID chip 324.

The passive RFID inlay 325 is a passive RFID pattern which encodes a specific signal, or is designed to emit an RF signal at a predetermined frequency, wavelength, amplitude, etc., when interrogated by an interrogation signal. The passive RFID inlay 325 can encode a unique identifier, or can broadcast a signal which can be associated with a unique identifier. The unique identifier of the passive RFID inlay 325 can be similar to or the same as the unique identifier stored within the active RFID chip 324. The passive RFID inlay 325 can function in parallel with the active RFID chip 324, and/or can provide a backup function if the power source for the active RFID chip 324, or the RFID chip 324 itself is damaged or fails.

Figure 4:
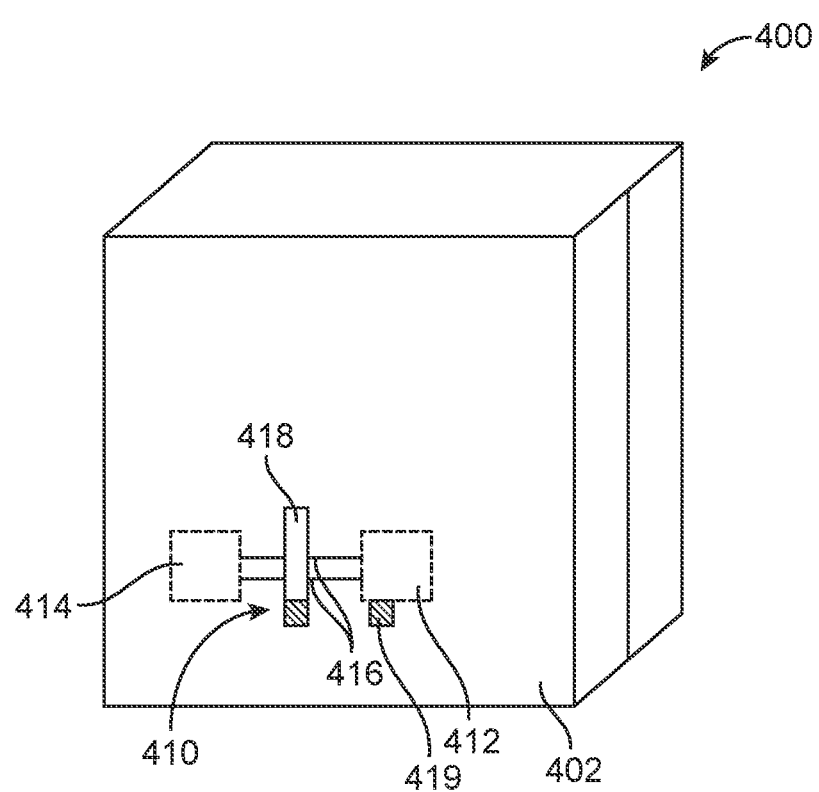
FIG. 4 is a perspective view of an item having an embodiment of a beacon device affixed thereto.

FIG. 4 is a perspective view of an item 400 having a beacon device affixed thereto. A beacon 410 is attached to a package 402. The beacon comprises a power source 412, a sensor 414, and electrical leads 416. The power source 412, the sensor 414, and the electrical leads 416 can be similar to those described elsewhere herein. The beacon also comprises a first tab 418 and a second tab 419. The first and the second tabs 418, 419 can include electrically isolating material, or can be made out of a high resistance material. In some embodiments, first tab 418 can comprise an adhesive which adheres tightly to the package and is laid over the leads 416. The first tab 418 also adheres tightly to the leads 418. When the first tab 418 is removed from the package 402, portions of the leads 416 break away from the rest of the leads 416, and are removed with the first tab 418, thus breaking the connection between the power source 412 and the sensor 414 and deactivating the beacon 410.

The second tab 419 can be made of electrically isolating material which is installed in a first position, inserted between cells of a battery in the power source 412 or positioned between an output connector of the power source 412 and the leads 416. Thus, with the second tab 419 in the first position, the second tab 419 interrupts the circuit between the power source 412 and the sensor 414. When a user wishes to activate the beacon 410, the user pulls the second tab 419 from the first position to a second position, where the second tab 419 is removed and separated from the power source 412, and the package 402 generally. Removal of the second tab 419 will create electrical connection between the power source 412 and the sensor 414 via leads 416. The creation of this electrical connection can activate or turn on the sensor 414, which will then be able to, and, in some embodiments, may begin to, send and/receive signals corresponding to the unique identifier or serial number of the sensor 414.

The first tab 418 remains in place after removal of the second tab 419 to allow the beacon 410 to continue operation. When the item 400 has been delivered, the recipient can pull or remove the first tab 418 to sever the leads 416, and deactivate the beacon 410 by disconnecting the power source 412 and the sensor 414.

Figure 5:
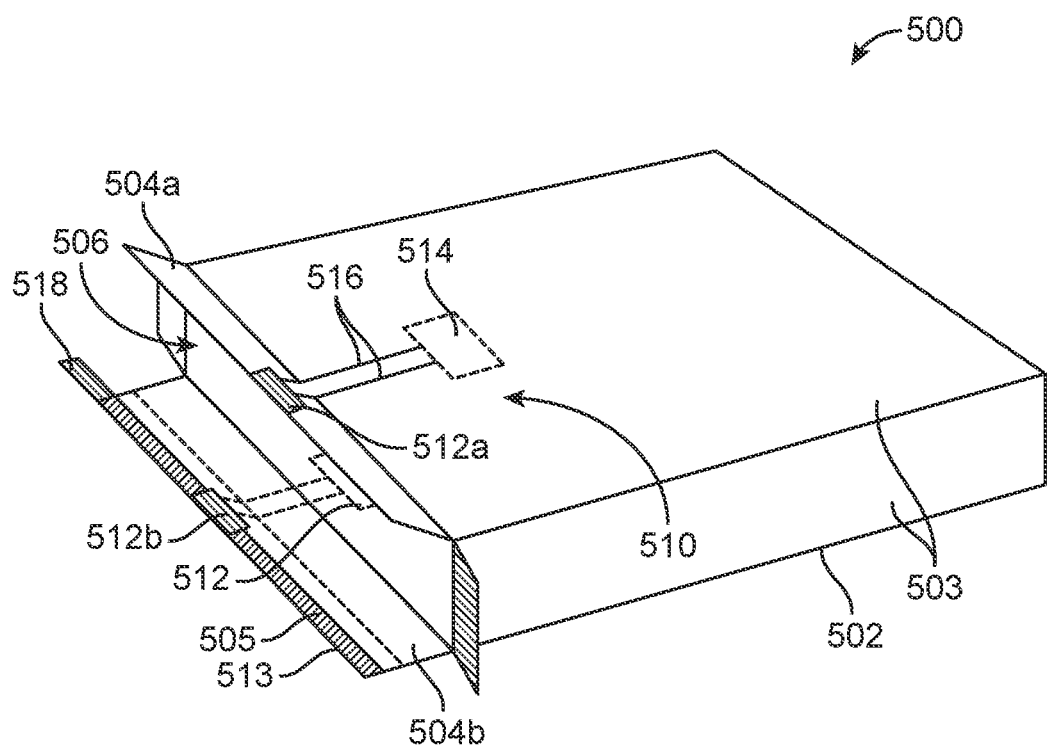
FIG. 5 is a perspective view of an item having an embodiment of a beacon device affixed thereto.

FIG. 5 is a perspective view of an item 500 having an embodiment of a beacon 510 affixed thereto. The item 500 comprises a package 502 and a beacon 510 attached thereto or embedded therein. The package 502 comprises a plurality of sides 503, surrounding a volume 506, a first closing flap 504a, and a second closing flap 504b. The first closing flap 504a and the second closing flap 504b are attached to opposing sides 503. The first closing flap 504a includes a first contact 512a and the second closing flap 504b includes a second contact 512b. The second closing flap 504b also comprises an adhesive 505 for sealing the package 502 closed. The adhesive 505 is covered by an insulating cover 513. The insulating cover is a removable, electrically insulating strip which protects the adhesive and prevents electrical communication between the first contact 512a and the second contact 512b before the insulating cover 513 is removed.

The first and second contacts 512a-b are electrically conductive patterns, pads, plates, wires, or the like which are configured to conduct electricity. The first contact 512a is disposed on a surface of the first closing flap 504a which does not face the volume 506 of the package 502. The second contact 512a is disposed on a surface of the second closing flap 504b which faces or enters the volume 506 when the second closing flap 504b is closed. The first and second contacts 512a-b are disposed on opposing flaps, and are positioned such that when the first and second closing flaps 504a-b are closed, the first and second contact 512a-b are brought into electrical contact with each other.

The beacon 510 comprises a power source 512, a sensor 514, and leads 516, similar to those described elsewhere herein. The leads 516 extend from the power source 512 to the second contact 512b and from the first contact 512a to the sensor 514. The leads can be embedded in the package 502, or can be attached to a surface thereof. In some embodiments, the first contact 512a and second contact 512b can each comprise two individual contacts, one corresponding to each lead extending between the power source 512 and the sensor 514.

When the package 502 is in an unused state, such as when it is received by a user or shipper who desires to ship an item, the insulating cover 513 is in place over the adhesive 505 and over at least a portion of the second contact 512b. The user places an article to be shipped in the volume 506 of the package. The user can then remove the insulating cover 513, exposing the adhesive 505 and the second contact 512b. The user folds the first closing flap 504a and then the second closing flap 504b. As the second closing flap 504b is closed, the adhesive 505 contacts the first closing flap 504a, and the first and second contacts 512a-b are brought into electrical contact with each other. The package 502 is sealed by adherence of the adhesive to the first closing flap 504a.

When the first contact 512a makes electrical contact with the second contact 512b, the circuit between the power source 512 and sensor 514 is completed, and the sensor 514 is turned on or activated. When the sensor is activated, the user can connect a Bluetooth device to the sensor 514, or can provide a code from the beacon 510 to the distribution network as described elsewhere herein.

The second closure flap 504b also includes an opening tab 518. The opening tab is embedded in the second flap 504b and runs along a length of the second closure flap 504b. The opening tab 518 comprises a non-tearing material such that it can be pulled to open the package 502. When the recipient receives the item 500, the recipient opens the package 502 by pulling on the opening tab 518. The opening tab 518 tears away the portion of the second closure flap 504b having the adhesive, which disconnects the first closing flap 504a from the second closing flap 504b. This action may also sever a portion of the leads 516 running between the power source 512 and the second contact 512b. As the first and second closing flaps 504a-b are opened, the first and second contacts 512a-b move out of electrical connection with each other. By one or both of these methods, the power source 512 is disconnected from the sensor 514, and the sensor 514 is deactivated.

In some embodiments, the beacon 510 includes a cellular network transmitter that transmits a signal when the package is opened to a central hub or server to confirm that the package was delivered and opened.

Figure 6:
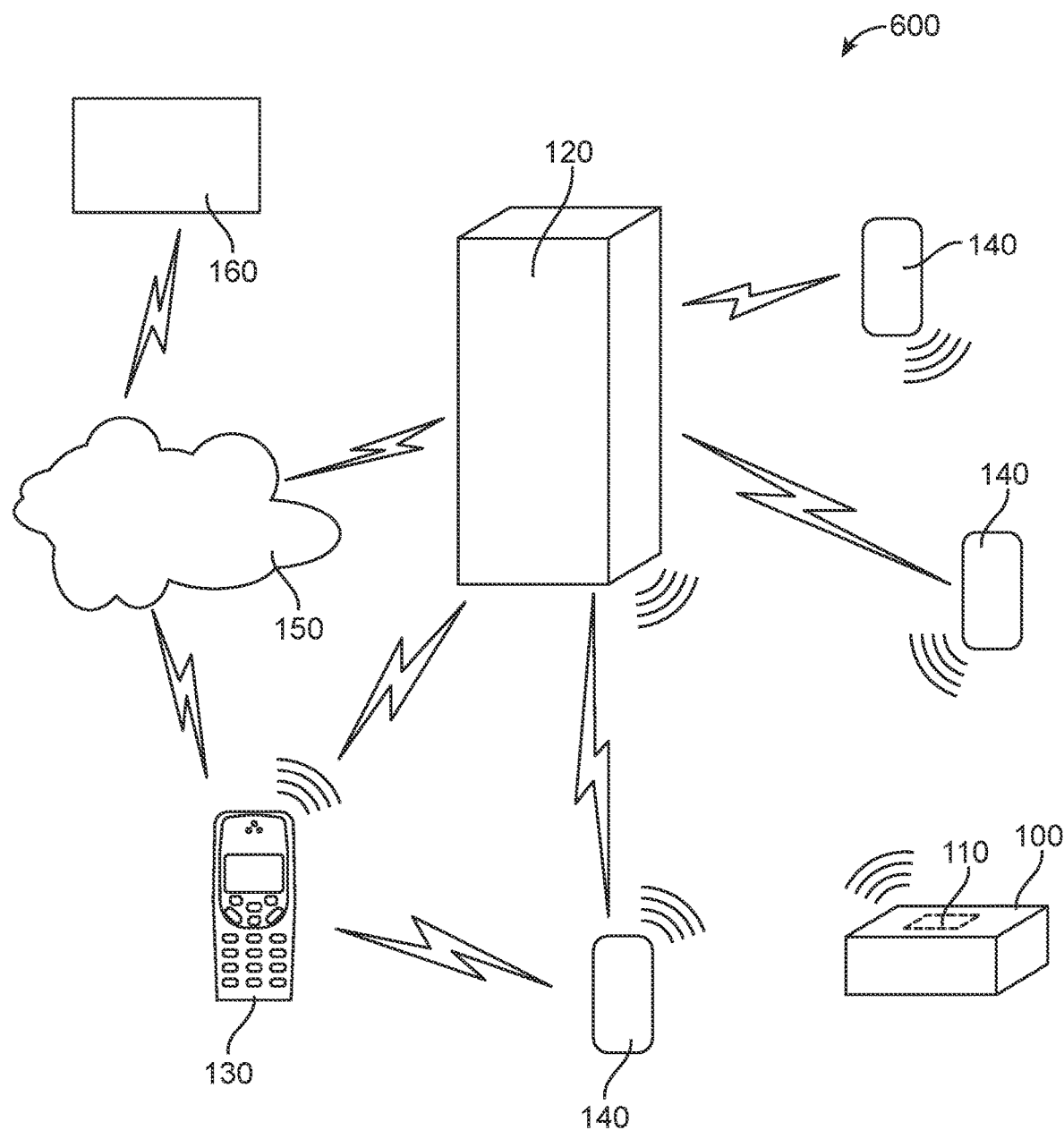
FIG. 6 depicts a system for identifying or interacting with an item having a beacon thereon.

FIG. 6 depicts a system 600 for identifying an item having a beacon 110 thereon. The system comprises a central hub 120, a mobile computing device 130, a plurality of sensors 140, a network 150, and a user interface 160. The central hub 120 includes a processor and a memory for carrying out all the functions of the central hub 120. The central hub is in wired or wireless communication with the mobile computing device 130 and the plurality of sensors 140. The central hub 120 can also be in communication with the mobile computing device 130 and the user interface 160, either wired, wireless, via a network 150.

The mobile computing device 130 can be any mobile device configured to emit an interrogation signal to the beacon 110 and receive a signal therefrom. In some embodiments, the mobile computing device 130 can be a mobile delivery device carried by a carrier or a smartphone. The mobile computing device 130 is also configured to receive information from the central hub 120 regarding information received from the beacon 110 via the sensors, as will be described in greater detail below.

The plurality of sensors 140 are configured to emit an interrogation signal and to receive a response to the interrogation signal. The plurality of sensors are also able to detect a signal transmitted from the beacon 110 on the item 100. The plurality of sensors can be placed in a distribution network facility, such as at a hub, at a unit delivery facility, in a truck, train, plane, or any other location of the distribution facility. The plurality of sensors 140 can be arranged in specific locations according to the layout of the facility in which they are placed. For example, in some embodiments, the beacon 110 has a transmitting range of 10 feet-150 feet, or 500 feet (using a Bluetooth 5.0 protocol) or 900 feet (using a hybrid RFID). In order to provide adequate coverage of sensors and to ensure that the beacon is never out of transmitting range of the plurality of sensors 140, a sufficient number of sensors 140 are placed in the facility at specific locations to provide adequate coverage of the facility.

In some embodiments, delivery resources, such as vehicles, can include sensors 140, and can be remote from a distribution facility. These sensors 140 are able to communicate wirelessly with the central hub 120 to report whether signals from beacons 110 are detected or detectable on the delivery resource transporting the item 100.

The sensors 140 are configured to send interrogation signals into the facility and to receive a response from the beacon 110. In some embodiments, the sensors 140 need not send interrogation signals, but simply listen and receive signals from a beacon 110 which is continuously, periodically, or intermittently broadcasting a signal.

The sensors 140 receive the signal from the beacon 110 and interpret the signal as the unique identifier or as the serial number. In some embodiments, the sensors 140 receive the signal and transmit the signal to the central hub 120 which then determines the unique identifier or the serial number encoded in the signal, or which is associated with the received signal in the memory of the central hub 120.

The operation of the system 600 will now be described. When a user desires to send an item in a package 102 having a beacon 110 thereon, the user can register the beacon 110 with the distribution network via the user interface 160. In some embodiments, the user interface 160 can be operable or embodied on a user's computing device, such as a user's smartphone, as a mobile software application. As described elsewhere herein, this can be done by providing a computer readable code, serial number, or the like to the distribution network via a computer interface (user interface 160) such as an application, a computer terminal, a website, a mobile computing application, etc. In some embodiments, the beacon 110 can be registered by scanning a computer readable code using a smartphone having an optical, IR, or other imaging device. In some embodiments, the beacon can be registered by performing a pairing procedure via a near field communication network, such as Bluetooth, and the like. When an identifier unique to the beacon 110 is entered in the application, scanned, or a paired, the user interface 160 communicates information regarding the beacon 110, including, for example, a unique identifier or serial number, a time of registration, information regarding the user registering the beacon 110, the geographic location of the beacon 110 at the time of registration (e.g., if registered via a GPS enabled computing device), payment information, or any other desired information, or any combination of the above. As will be described in greater detail below, a similar procedure may be performed to deactivate a beacon 110 device.

When the beacon 110 is registered with the distribution network, the unique identifier or serial number is stored in the central hub 120 (via the network 150). The central hub 120 stores the unique identifier or serial number of the beacon 110. In some embodiments, the central hub 120 also stores, or has previously stored an identifier corresponding to the signal that is emitted by the beacon 110. In some embodiments, the signal emitted by the beacon encodes the unique identifier, or is a signal that corresponds with the unique identifier, or is recognizable as the unique identifier. The registration process may activate the beacon device 110, wherein the beacon 110 begins transmitting a signal, or becomes responsive to an interrogation signal. This can be accomplished via a signal transmitted from the central hub 120 to the user interface 160 via the network 150. For example, a Bluetooth device paired with the beacon 110 can receive a signal from the central hub 120, and the Bluetooth device can send an activation signal to the beacon 110.

When a user desires to find an item 100 which may have been lost or misrouted, or if delivery requirements change and the item 100 needs to be delivered on an expedited basis, the item 100 may need to be individually located within the distribution network facility. This information can be provided to the central hub 120 from the user interface 160, via the network 150. In some embodiments, the information can be provided from a mobile computing device 130, such as one used by an employee, supervisor, or other distribution network personnel. A supervisor may also have access to the user interface 160, and which may provide different options or functionality for a supervisor than for a user desiring to send the item 100 having the beacon 110 thereon.

For example, a user may desire to locate the item 100 which is to be delivered, and the user may request information regarding the location of the item 100. In some embodiments, the central hub can receive a communication directing that the item 100 be rerouted based on changed delivery circumstances or expedited needs. A supervisor, carrier, or other facility personnel can provide this input via the user interface 160. In some embodiments, the central hub 120 may receive an automated signal from another system of the distribution network to reroute the item 100.

In some embodiments, the request to identify or locate the item 100 is generated automatically by the central hub 120. For example, the central hub 120 may receive a message that a delivery window for an item has been missed, or an expected scan event on item processing equipment for the item 100 did not occur, or if a scan event is detected for the item 100 at a location which is not along a predicted, proposed, likely, or most efficient delivery route.

When the request to identify the item 100 is received, a message can be displayed on the mobile computing device instructing a carrier or other personnel at the distribution facility to identify the item. The carrier can acknowledge the request at the mobile computing device 130 and initiate the search. In some embodiments, the search initiates automatically in response to the request to locate the item 100, and the sensors 140 are activated. The sensors 140 send interrogation signals and detect responsive signals, or they sensors are activated to listen for the unique identifier or serial number, or to the signal transmitted by the beacon 110 corresponding to the unique identifier or serial number. In a large facility, one or more of the plurality of sensor 140, but not all the sensors 140, will be in range of the specific signal transmitted from the beacon 110. In a large facility, there may also be additional items 100 emitting signals for other beacons, other than the beacon of interest. The plurality of sensors 140 and the central hub 120 are configured to identify the specific signal for the item being searched for.

The sensors 140 that are in proximity to the item 100 send signals to the central hub 120, and/or directly to the mobile computing device 130. The sensors 140 can send their own location, or the central hub 120 knows their location, and so the central hub 120 can calculate an approximate position of the item 100, or can direct the mobile computing device 130 in the direction of the beacon 110, based on the received signal. In some embodiments, the plurality of sensor s 140 can also sense the strength of the emitted signal from the beacon 110, and can send this information to the central hub 120 so the central hub can triangulate a location of the item 100.

The central hub 120 or the sensors 140, or both send signals to the mobile computing device with a visual or audible indicator or both, showing where the carrier should move to find the item 100. As the mobile computing device 130 moves closer to the physical location of the item 100, as determined by the signal from the beacon 110, the mobile computing device 130 can alert the carrier to begin to look through the items in the facility for the specific item.

In some embodiments, the beacon 110 can respond to an interrogation signal from the plurality of sensors 140 by emitting a visual or audible alarm, or by vibrating. The sound, light, or vibration, or any combination of these, can assist the carrier with identifying the physical location of the item 100.

When the item 100 is located, the central hub 120 can notify the user that the item 100 has been located, the location of the item 100, and any next actions to be taken. The central hub 120 may instruct the carrier where to put the item 100 for further processing, as in the case of rerouting, expedited delivery, or changed delivery circumstances.

In some embodiments, the system 600 is configured to identify the presence of items 100 having beacons 110 thereon without a specific request to locate the item 100. For example, a distribution facility may receive many items in a shipment, such as from a truck, pallet, and the like, which are to be processed, sorted, and sent out for delivery. The sensors 140 may be passively listening for a signal from any beacon-enabled item 100, having a beacon 110 thereon. When an item 100 arrives in the facility which has a beacon 110 thereon, the sensors 140 identify that a beacon 110 is present in the facility. The central hub 120 receives a notification that a beacon 110 is present, and queries a database using the unique identifier of the beacon 110. The database may indicate whether a particular item 100 having a particular beacon 110 thereon should be handled differently than other items, for example, prioritized, segregated, place on a conveyor or another vehicle first, and the like. in some embodiments, all beacon-enabled items initiate a similar response. When the beacon 110 is detected, the sensors 140 can send an interrogation signal to cause the beacon 110 to emit light or sound, or to vibrate, or any combination of these to alert facility personnel to the presence of the beacon 110.

For example, if a beacon 110 is detected at a facility, in a vehicle, or in any other location in the distribution network, the sensors 140 can communicate the presence of the beacon 110 to the central hub 120. The central hub 120 can query an item routing database to identify the intended path for the beacon 110 through the distribution network, and determine whether the beacon 110 is supposed to be in the distribution facility or vehicle in which it was detected. If the beacon 110 is supposed to be in the distribution facility or vehicle, no action is taken. If the beacon 110 is not supposed to be in the distribution facility, vehicle, or location in which it is identified, the central hub 120 triggers an alert to a carrier, driver, distribution facility personnel that the item 100 is lost, misrouted, or the like. The central hub 120 also instructs personnel identify and find the item 100 and take corrective action. In some embodiments, the corrective action may be taken automatically by rerouting the item 100 through mail processing equipment when a misrouting is detected. The beacon 110 can be activated to alarm, vibrate, illuminate, and the like to aid in locating the item 100 on which the beacon 110 is located.

In some embodiments, an item 100 having a beacon 110 thereon can interact with an item receptacle as the item is being delivered. For example, a delivery receptacle, such as a mailbox, can have a sensor or detector configured to receive a signal from a beacon 110. The mailboxes can be similar to those described in U.S. Patent Application No. 62/312,323, filed Mar. 23, 2016, and U.S. patent application Ser. No. 15/466,475, filed Mar. 22, 2017, the entire contents of which are hereby incorporated by reference.

The delivery receptacle can receive a signal from a beacon 110 on an item 100 as it is brought into proximity with the receptacle, or is placed inside the receptacle. The delivery receptacle is configured to receive the unique identifier or serial number from the beacon 110 and communicate the unique identifier or serial number to a central server. The central server can identify the beacon 110 and use the unique identifier or serial number to identify the item that was delivered. This information can be used to confirm delivery of an item in real-time, or near real-time to a recipient, a sender, or both. In some embodiments, the central server can automatically send a notification of delivery to a user, via a smartphone, email, text message, and the like, upon receipt of the unique identifier from the receptacle.

For example, a sender may send multiple items 100, each having a beacon 110 with its own unique identifier. In some embodiments, the beacons 110, which are attached to similar or identical items, may all have the same unique identifier. The sender may wish to know exactly when the items are delivered to the intended delivery receptacles. When the beacons 110 interact with the receptacles, the signals confirming delivery can be provided to the sender for confirmation.

In some embodiments, the beacon 110 can be modified so that the signal from the beacon can only extend a short distance from the beacon 110, such as 1 inch, 6 inches, 1 foot, 2 feet, or any other desired length. This short length prevents the beacon 110 from interacting with receptacles as the item 100 passes by receptacles on its way to delivery in a specific receptacle.

In some embodiments, the notification of delivery to a user can include a link to additional content. In some embodiments, when the user picks up the item 100, the user's smartphone can receive the signal from the beacon 110. The signal can include the unique identifier or serial number of the beacon 110, and can include additional information such as a hyperlink, which is sent to the user's smartphone. The user's smartphone, in response to receiving the hyperlink from the signal from the beacon 110 can direct the user's smartphone to additional content. The hyperlink can be encoded into the beacon 110 by the sender of the item 100, and the hyperlink or additional content from the beacon 110 can be related to the item 100.

In some embodiments, when a user chooses to follow a link to additional content, the link will direct the smartphone's browser through a server associated with the distribution network, such as a USPS server, to access the additional content. Traffic through the USPS server can be tracked and traced, and the sender of the item 100 or the provider of the additional content can trace how many times recipients access the additional content based on receiving the items 100 having beacons 110 thereon.

A beacon 110 may transmit a signal, or may otherwise be active (in the case of an active beacon) until deactivated. In the case where the beacon 110 is not deactivated by opening of the item 100, or via a pull tab as described above, it may be advantageous to deactivate a beacon 110 remotely, around a time of delivery of the item 100, for example, shortly before delivery, upon delivery, or shortly after delivery.

Beacon 110 deactivation can occur via several ways. For example, a beacon 110 may be carried with a carrier as the carrier moves along a delivery route. The carrier can carry a mobile computing device 130 along the delivery route. The mobile computing device 130 can have a GPS location module and can determine its geographic location. The mobile computing device 130 stores information regarding the carrier's route, geofences for the delivery points along the route, and identity of items 100 for delivery along the carrier's route, and the same information can be stored in the central hub 120. As the mobile computing device 130 along the route, it will enter a geofence corresponding to the delivery point for the item 100. The mobile computing device 130 can send a signal to the central hub 120 indicating the mobile computing device 130 is in, near, or has transited through the geofence of the delivery point. Upon approaching, entering, leaving, or transiting through the geofence, the mobile computing device 130, or the central hub 120, can send a wireless signal to the beacon 110 to instruct the beacon 110 to deactivate. The signal can be sent via an antenna in the mobile computing device 130, via a cellular network, an RF signal, via the nearest Wi-Fi node, and the like.

In some embodiments, when the carrier delivers the item 100 having the beacon 110 thereon, the carrier may be instructed to scan the item 100, such as a label having a computer readable code thereon, or a code specific to the beacon 110. When the carrier puts the item 100 in a mail receptacle, or on a porch, or other designated location, the carrier scans the item 100 with the mobile device 130 to generate delivery information. The delivery information can be communicated to the central hub 120, which can then send a deactivate signal to the beacon 110 on the item 100 which was delivered. In some embodiments, the deactivate signal can be sent automatically by the mobile computing device 130 upon the delivery scan of the item, with or without communication with the central hub 120.

In some embodiments, a recipient or sender of the item may deactivate the beacon 110 via the user interface 160. When the item 100 is delivered, the central hub 120, or other component of a distribution network can generate and send a delivery confirmation message to the sender of the item 100. The sender of the item can then access the user interface 160, such as a mobile application on the user's smartphone, access the user's account, and indicate that the user wishes the beacon 110 to be deactivated. The deactivation request can be communicated to the central hub 120, which can then send a deactivate signal to the beacon 110 as described elsewhere herein. In addition to deactivation after delivery, the user can deactivate a beacon 110 enabled item 100 at any time by accessing the user interface 160 and requesting deactivation.

A recipient may similarly deactivate a beacon 110 when the recipient receives the item 100 having the beacon 110 thereon. When the item 100 is received, the recipient may access the user interface 160 as described elsewhere herein (e.g., mobile application, scanning a code, Bluetooth pairing, and the like), and request that the beacon 110 be deactivated. In some embodiments, the act of scanning the item 100 by the recipient or pairing with the beacon 110 can automatically deactivate the beacon 110.

A deactivate signal sent to the beacon 110 can instruct the beacon 110 to stop broadcasting a signal, and can be irreversible to prevent inadvertent tracking of a beacon 110 after delivery.

Figure 7:
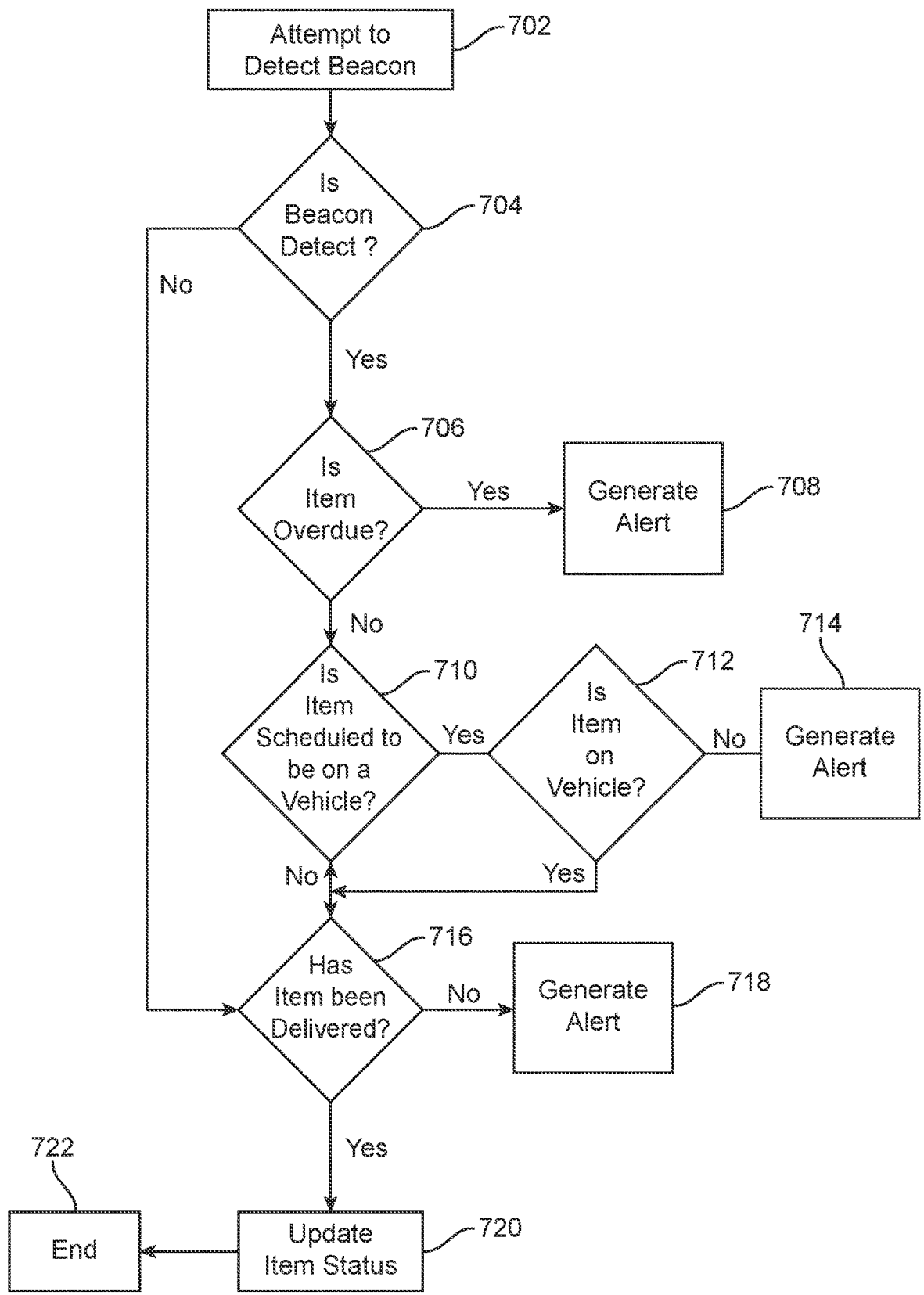
FIG. 7 is a flow chart depicting a process using a beacon enabled item.

FIG. 7 depicts a flow chart showing exemplary operations using a beacon-enabled distribution item. Although this process is described in terms of a single beacon 110, the process of FIG. 7 can be performed with a plurality of beacons 110. A process 700 begins in block 702, wherein the system 600 attempts to detect a beacon 110. The attempt to detect the beacon 110 can be an active interrogation signal which causes a beacon 110 to positively respond. In some embodiments, the attempt to detect the beacon in block 702 can be a passive listening step, listening for a broadcast from a beacon 110. In some embodiments, the beacon 110 broadcasts a signal at a given interval or at a certain time of day.

The process 700 moves to decision state 704, wherein it is determined whether the beacon 110 is detected. The central hub 120 determines whether it, any sensor 140, or any mobile computing device 130 has received a signal from the beacon 110. The central hub 120 can periodically or continuously detect beacons 110 and determine whether the items 100 are in their intended locations. The central hub 120 can also compare the detected beacons 110 with the beacons 110 that are expected to be at a particular facility or on a particular vehicle.

If the central hub 120 has not received a signal from a beacon 110 which is expected to be active, intended to be in a particular facility, vehicle, or other location, the process 700 moves to decision state 716, wherein it is determined whether the item 110 with the beacon 110 which was not detected, was delivered. The operation of decision state 716 will be described in greater detail below. To allow the central hub 120 to determine whether a beacon 110 should be detected, the central hub 120 can have stored, or can access other systems to retrieve, information for all active beacons 110 throughout the distribution network. The central hub 120 can have stored, or have access to, information regarding the intended location, last scan data, or other tracking information for items 100 having beacons 110 thereon. Thus, as the central hub 120 receives signals from the beacon 110 or from one or more of the sensors 140 which has detected the beacon 110, the central hub 120 will know that the beacon 110 is where it is supposed to be. Further, in some embodiments, the central hub 120 will only be looking for signals from beacons 110 which are intended to be in proximity to the sensors 140, in a particular facility, on a vehicle, etc. Thus, if it is determined in state 704 that the central hub 120 has not received a signal indicative of the presence of a beacon 110 which is not supposed to be detected, then the process moves to state 716 and it is determined whether the item 100 having the beacon 110 thereon has been delivered.

If the beacon 110 is detected in state 704, the process 700 moves to decision state 706, wherein it is determined if the item 100 is overdue for delivery. As noted above, the central hub 120 has access to information for the item 100, including intended delivery destination, class of service, intended delivery date, induction date, recipient, dimensions and weight, special handling considerations (for example, temperature requirements, signature requirements, fragile designation, in person delivery, etc.), and other item information. When the central hub 120 receives a signal indicative of the beacon 110, the central hub 120 accesses the item information for the item 100 with which the beacon 110 is associated. Using the item information, the central hub 120 can identify that the item 100 is behind schedule or is likely to be delivered late.

If the item is likely to be delivered late, or is behind schedule, misrouted (according to an item routing plan identifying an intended route through the distribution network), or otherwise delayed, the process 700 moves to step 708, wherein an alert is generated. The control hub can generate an alert and send an automatic notification to a mobile computing device 130, to a carrier, to a facility worker, or other individual. The alert can instruct the carrier, facility worker, or other individual to search for the particular item 100 and take additional steps to ensure the item 100 is delivered on time. This can include giving the item 100 priority over other items, instructing a vehicle (or vehicle operator) to hold a vehicle so the item 100 can be added to the vehicle. The alert can also provide a notification to a sender and/or a recipient of the item 100 indicating that the item is behind schedule, or that there is a delay. The communication can also include an offer for a reduced shipping rate, a refund, or other action. The alert can also provide instructions to mail processing equipment to automatically take action to reroute the item 100 having the beacon 110 thereon.

Generating an alert can also send a communication to the beacon 110 to activate an indicator, such as an audible, visual, or vibrational indicator. Generating an alert can activate a finding application on a computing device of an individual working in the delivery facility, which will direct the worker to the beacon 100, as described elsewhere herein.

If in state 706 the item is not determined to be overdue, the process 700 moves to decision state 710, wherein it is determined if the item 100 is scheduled to be on a vehicle. The central hub 120 can determine from the item information, which can include a sorting or routing plan for the item 100, whether the detected beacon 110 is supposed to be on a vehicle for transport to the next location in the routing plan, for example, a regional post office, a local post office, or the final destination.

If the item 110 is scheduled to be on a vehicle, the process moves to decision state 712, wherein it is determined whether the item is on a vehicle. The vehicle has one or more sensors 140 thereon that can detect a signal from the beacon 110. Using the sensors 140 on the vehicle, the central hub 120 can determine whether the detected beacon 110 is on the vehicle. The central hub 120 knows which sensors have detected the beacon 110, and, where the range of the beacon 110 is limited, the central hub 120 can triangulate a location of the beacon 110.

In some embodiments, the initial detection of the beacon 110 in decision state 704 can be made by a sensor 140 on a vehicle. The central hub 120 can also know the position of each vehicle, using GPS or other location awareness information on the vehicles. If the central hub 120 receives a signal from a sensor 140 that detects the beacon 110 on the vehicle, and if the vehicle is not at a distribution facility, the central hub 120 can determine that the item 100 is on a vehicle without the need to determine whether the item is scheduled to be on a vehicle. In some embodiments, if the beacon 110 is detected on a vehicle, and the central hub 120 determines that the item 100 should not be on the vehicle, then central hub 120 can generate an alert as described elsewhere herein.

If it is determined in state 712 that the item is not on a vehicle, but is scheduled to be on a vehicle, the process 700 moves to block 714, wherein an alert is generated. Generating an alert in block 714 can be similar to that described with regard to block 708, and is designed to cause location of the item and loading the item 100 onto the vehicle. If the vehicle has not yet left the distribution facility, generating an alert can hold the vehicle until the item is loaded onto the vehicle.

If it is determined in state 712 that the item 100 is on the vehicle, as scheduled, the process 700 moves to decision state wherein it is determined whether the item has been delivered. This can involve the passage of sufficient time for the item 100 to work its way through the system toward final delivery. In some embodiments, this portion of the process can involve waiting until the next detection of the beacon 110, or until the item 100 is scanned by a mobile computing device 130.

Returning to decision state 710, if the item is not scheduled to be on a vehicle, the process 700 moves to decision state 716, wherein it is determined whether the item 110 has been delivered to its final destination. The central hub 120 can determine whether the item 100 has been delivered to its final destination based on scan data received from mobile computing devices 130. In some embodiments, the mobile computing devices 130 can detect and communicate with the beacon 110. For example, the mobile computing device 130 can receive a signal from a beacon 110 that is with a carrier or vehicle for delivery. The mobile computing device 130 sends its location information (such as via GPS) to the central hub 120 via the network 150. The mobile computing device also sends the signals indicative of the beacon 110 through the network 150. These signals can be sent periodically or continuously. The central hub 120 knows which mobile computing device 130 is assigned to the delivery resource delivering the item 100 having the beacon 110 thereon. Thus the central hub 120 can listen for the status of a particular beacon 110 from a particular mobile computing device 130.

As the GPS coordinates of the mobile computing device 130 reach the address or intended destination, or fall within a geofence corresponding to the intended destination, the central hub 120 can determine that the item 100 having the beacon 110 thereon was delivered. In some embodiments, the central hub 120 receives subsequent signals from the mobile computing device 130 confirming that the beacon 110 is no longer detected by the mobile computing device 130, indicating the mobile computing device 130 is no longer within range of the beacon 110. The central hub 120 can use this information, and the GPS location information to determine whether the item 100 has been delivered.

If the item 100 is determined to be delivered the process 700 moves to block 720, wherein the item 100 status is updated to "delivered". If the item is not determined to be delivered, the process moves to step 718, wherein an alert is generated. Generating an alert in step 718 can be similar to that described with regard to step 714 and 708.

The process 700 then moves to step 722, where process 700 ends. The process 700 is exemplary, and any one of the decision states or steps can be omitted without departing from the scope of the invention. For example, in some embodiments, the process 700 can proceed without determining whether an item was overdue, without determining whether an item was scheduled to be on a vehicle, without determining whether the item is on a vehicle, or whether the item has been delivered. Thus, process 700 can be performed with any combination of decision states and steps shown in FIG. 7.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The central hub 120 may comprise a processor such as, for example, a microprocessor, such as a Pentium® processor, a Pentium® Pro processor, a 8051 processor, a MIPS® processor, a Power PC® processor, an Alpha processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, inter-changed or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for automatically tracking the status of a distribution item comprising:

a plurality of distribution items at a plurality of distribution facilities and a plurality of beacons each of the plurality of distribution items having one of the plurality of beacons thereon;

one or more sensors arranged at each of the plurality of distribution facilities configured to detect a plurality of identifier signals emitted from the beacon on each of the plurality of distribution items;

a central hub having a memory, the central hub configured to:

receive, at a plurality of distribution facilities, a plurality of beacons and a plurality of distribution items, each of the plurality of distribution items having one of the plurality of beacons thereon;

detect, by sensors at each of the plurality of distribution facilities, a plurality of identifier signals emitted by the beacons, each of the plurality of beacons emitting one of the plurality of identifier signals;

associate, in a memory each identifier signal of the plurality of identifier signals with a unique serial number corresponding to one of the plurality of beacons, and with an identifier of a distribution facility of the plurality of distribution facilities where the identifier signal was detected;

receive a computer readable code identifying a specific unique serial number associated with one of the plurality of distribution items, query the memory to determine the corresponding identifier of the distribution facility associated with the specific unique serial number, and activate the beacon associated with the received specific unique serial number to emit an alert.

2. The system of claim 1, wherein the central hub is further configured to receive the computer readable code from a user interface.

3. The system of claim 1, wherein the central hub is further configured to deactivate the beacon associated with the received specific unique serial number.

4. The system of claim 1, further comprising a network, wherein the network enables communication between the central hub, and the one or more sensors.

5. The system of claim 1, wherein activating the beacon associated with the specific unique serial number to emit an alert comprises causing the beacon to continuously emit one of the plurality of identifier signals.

6. The system of claim 1, wherein the alert emitted from the beacon is a light.

7. The system of claim 1, wherein the alert emitted from the beacon is a sound.

8. A method of automatically tracking the location of a distribution item comprising:

receiving, at a plurality of distribution facilities, a plurality of beacons and a plurality of distribution items, each of the plurality of distribution items having one of the plurality of beacons thereon;

detecting, by sensors at each of the plurality of distribution facilities, a plurality of identifier signals emitted by the beacons, each of the plurality of beacons emitting one of the plurality of identifier signals;

associating, in a memory, each identifier signal of the plurality of identifier signals with a unique serial number corresponding to one of the plurality of beacons, and with an identifier of a distribution facility of the plurality of distribution facilities where the identifier signal was detected;

receiving, in a user interface, a computer readable code identifying a specific unique serial number associated with one of the plurality of distribution items;

querying the memory to determine the corresponding identifier of the distribution facility associated with the specific unique serial number;

activating the beacon associated with the specific unique serial number to emit an alert; and identifying a location of the beacon in the one of the plurality of distribution facilities from the alert.

9. The method of claim 8, wherein the plurality of identifier signals are continuously emitted from the beacons on the plurality of distribution items.

10. The method of claim 8, wherein the plurality of identifier signals are periodically emitted from the beacons.

11. The method of claim 8, wherein detecting, by sensors at each of the plurality of distribution facilities, a plurality of identifier signals emitted by the beacons occurs intermittently.

12. The method of claim 8, wherein detecting the plurality of identifier signals further comprises detecting the strength of the plurality of identifier signals.

13. The method of claim 8, wherein receiving the computer readable code comprises receiving the computer readable code from a user device.

14. The method of claim 8, wherein the one or more sensors comprise one or more mobile computing devices.

15. The method of claim 14, and wherein determining identifying the location of the beacon comprises confirming delivery of the distribution item to an intended delivery point by the one or more mobile computing devices.

16. The method of claim 8, further comprising deactivating the beacon associated with the specific unique serial number in response to identifying the location of the beacon.

17. The method of claim 8, wherein the identifier of the distribution facilities is an assigned distribution facility number.

18. The method of claim 8, wherein activating the beacon associated with the specific unique serial number to emit an alert comprises causing the beacon to continuously emit one of the plurality of identifier signals.

19. The method of claim 8, wherein the alert emitted from the beacon is a light.

20. The method of claim 8, wherein the alert emitted from the beacon is a sound.

* * * * *